US012230242B2

(12) United States Patent
Li et al.

(10) Patent No.: US 12,230,242 B2
(45) Date of Patent: Feb. 18, 2025

(54) SOUND GATHERING DEVICE FOR VOICEPRINT MONITORING AND PREPARATION METHOD

(71) Applicant: State Grid Jiangsu Taizhou Power Supply Company, Jiangsu (CN)

(72) Inventors: Yong Li, Jiangsu (CN); Ting Chen, Jiangsu (CN); Ling Ju, Jiangsu (CN); Jijing Yin, Jiangsu (CN); Ze Zhang, Jiangsu (CN); Xingchun Xu, Jiangsu (CN); Beibei Weng, Jiangsu (CN); Zhenguo Chuai, Jiangsu (CN); Yan Wu, Jiangsu (CN); Li Chen, Jiangsu (CN); Yang Cheng, Jiangsu (CN); Tianyu He, Jiangsu (CN); Le Yuan, Jiangsu (CN); Jie Qian, Jiangsu (CN); Debao Tang, Jiangsu (CN); Yanquan Zhu, Jiangsu (CN); Anqi Ding, Jiangsu (CN); Kaiming Bian, Jiangsu (CN); Wen Chen, Jiangsu (CN); Wanjian Hu, Jiangsu (CN); Hongbo Dai, Jiangsu (CN); Weijun Shi, Jiangsu (CN)

(73) Assignee: State Grid Jiangsu Taizhou Power Supply Company, Jiangsu (CN)

( * ) Notice: Subject to any disclaimer, the term of this patent is extended or adjusted under 35 U.S.C. 154(b) by 0 days.

(21) Appl. No.: 18/555,247

(22) PCT Filed: Jul. 20, 2023

(86) PCT No.: PCT/CN2023/108399

§ 371 (c)(1),
(2) Date: Oct. 12, 2023

(87) PCT Pub. No.: WO2024/032345

PCT Pub. Date: Feb. 15, 2024

(65) Prior Publication Data

US 2024/0428773 A1 Dec. 26, 2024

(30) Foreign Application Priority Data

Aug. 12, 2022 (CN) ........................ 202210965809.2

(51) Int. Cl.
*G01R 31/50* (2020.01)
*G01H 17/00* (2006.01)
(Continued)

(52) U.S. Cl.
CPC .................................... *G10K 13/00* (2013.01)

(58) Field of Classification Search
CPC ...... G01R 31/086; G01R 31/08; G01R 31/50; G01R 31/62; G01H 17/00; G01H 3/00;
(Continued)

(56) References Cited

U.S. PATENT DOCUMENTS 4,104,610 A * 8/1978 Inoue ..................... G10K 11/28 116/137 A
4,893,695 A * 1/1990 Tamura .................. H04R 1/345 181/146

(Continued)

FOREIGN PATENT DOCUMENTS

CN 104741794 A 7/2015
CN 105628182 A * 6/2016

(Continued)

OTHER PUBLICATIONS

International Search Report dated Oct. 24, 2023 from corresponding PCT Application No. PCT/CN2023/108399.

(Continued)

*Primary Examiner* — Edgardo San Martin
(74) *Attorney, Agent, or Firm* — ArentFox Schiff LLP

(57) ABSTRACT

Provided are a sound gathering device for voiceprint monitoring and a preparation method. The sound gathering device is a cone structure and includes a front end portion (1) and a rear end portion (2), the front end portion (1) is trumpet-shaped, an inner wall surface of the front end portion (1) is present a pattern array of a microstructure (3), and the microstructure (3) presenting the pattern array is formed through laser etching. A sound wave frequency monitored by the sound gathering device is 50 Hz~10 kHz, and a sound wave enters the sound gathering device from an entrance of the front end portion (1), is reflected through the pattern (Continued)

array of the microstructure (3) on the inner wall surface of the front end portion (1), and is transmitted from an exit of the rear end portion (2), and a sound pressure of the exit of the rear end portion (2) is 4 times~8 times a sound pressure of the entrance of the front end portion (1).

14 Claims, 3 Drawing Sheets

(51) Int. Cl.

| | |
|---|---|
| ***G10K 11/26*** | (2006.01) |
| ***G10K 13/00*** | (2006.01) |
| ***H02H 1/00*** | (2006.01) |
| ***H04R 1/32*** | (2006.01) |
| ***H04R 1/34*** | (2006.01) |

(58) Field of Classification Search
CPC .......... G01H 3/08; G10K 13/00; G10K 11/26; G10K 11/28; G10K 11/18; G10K 11/08; H04R 1/30; H04R 1/32; H04R 1/326; H04R 1/34; H04R 1/342; H04R 1/08; H04R 1/083; H02H 1/0023; H02H 1/0007; H02H 1/00; H04M 3/08; H04M 3/085; B23K 26/362
See application file for complete search history.

(56) References Cited

U.S. PATENT DOCUMENTS

| | | | | | |
|---|---|---|---|---|---|
| 5,710,377 | A * | 1/1998 | Youngquist | G10K 11/28 | 73/40.5 A |
| 6,069,958 | A * | 5/2000 | Weisel | H04R 3/005 | 381/56 |
| 6,087,760 | A * | 7/2000 | Yamaguchi | G10K 9/122 | 310/334 |
| 9,207,216 | B2 * | 12/2015 | Suzuki | G01N 29/24 | |
| 10,638,238 | B1 * | 4/2020 | Kienzle | H04R 25/402 | |
| 2020/0184054 | A1 | 6/2020 | Storm et al. | | |

FOREIGN PATENT DOCUMENTS

| | | | | | |
|---|---|---|---|---|---|
| CN | 108616784 | A | * | 10/2018 | H04R 1/08 |
| CN | 109365995 | A | | 2/2019 | |
| CN | 109951768 | A | | 6/2019 | |
| CN | 110082653 | A | | 8/2019 | |
| CN | 209264896 | U | | 8/2019 | |
| CN | 111095010 | A | | 5/2020 | |
| CN | 112051083 | A | * | 12/2020 | |
| CN | 112305462 | A | | 2/2021 | |
| CN | 114280436 | | | 4/2022 | |
| CN | 217484435 | U | * | 9/2022 | |
| CN | 115255650 | A | | 11/2022 | |
| CN | 116519130 | A | * | 8/2023 | |
| CN | 116643212 | A | * | 8/2023 | |
| DE | 4007440 | C1 | * | 5/1991 | |
| FR | 2152468 | A1 | * | 9/1973 | |
| GB | 448864 | A | * | 6/1936 | |
| GB | 487415 | A | * | 6/1938 | |
| GB | 705450 | A | * | 3/1954 | |
| JP | H07245796 | A | | 9/1995 | |
| JP | 2004333390 | A | | 11/2004 | |
| WO | WO-2012161369 | A1 | * | 11/2012 | G01H 3/00 |

OTHER PUBLICATIONS

Office Action dated Jun. 17, 2024 from corresponding Chinese Application No. 202210965809.2.

* cited by examiner

Prefabricate a sound gathering device with a cone structure

↓

Plan a path where a laser beam travels based on a pattern array of an inner wall surface of the front end portion of the sound gathering device

↓

Set a parameter value of a laser

↓

Build a laser focusing device according to a laser beam focusing manner to focus a laser beam emitted by the laser

↓

Start the laser, and perform laser etching on the inner wall surface of the front end portion to prepare a microstructure of an inner surface of the sound gathering device

FIG. 5

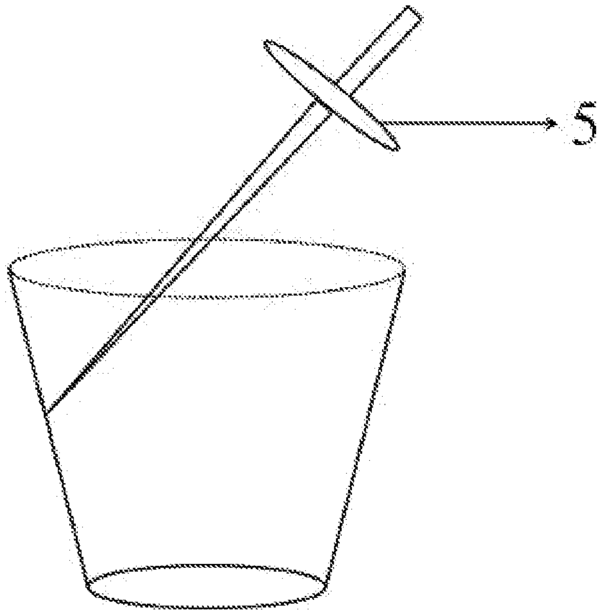

FIG. 6

SOUND GATHERING DEVICE FOR VOICEPRINT MONITORING AND PREPARATION METHOD

CROSS REFERENCE TO RELATED APPLICATION(S)

This application is a national stage application filed under 35 U.S.C. 371 based on International Patent Application No. PCT/CN2023/108399, filed on Jul. 20, 2023, which claims priority to Chinese Patent Application No. 202210965809.2 filed with the China National Intellectual Property Administration (CNIPA) on Aug. 12, 2022, the disclosures of both of which are incorporated herein by reference in their entireties.

TECHNICAL FIELD

The present application relates to the technical field of voiceprint monitoring, for example, to a sound gathering device for voiceprint monitoring and a preparation method.

BACKGROUND

An electrical equipment will produce weak acoustic signals due to reasons such as iron core looseness or partial discharge in the operation process, and operation and maintenance personnel with rich experience may qualitatively judge whether the equipment has faults or not through abnormal sounds emitted by the electrical equipment. However, the manual identification method has low detection efficiency, consumes time and labor, has strong subjectivity, depends on engineering experience of patrol personnel, is limited in an audible sound frequency band range, has a narrow sound wave frequency band, cannot achieve the real-time ultrasonic frequency band monitoring of the electrical equipment, and cannot be adapted to the requirement of monitoring of the electrical equipment.

A running state of the electrical equipment is determined by utilizing the sound parameter, in response to different running states of different electrical equipments, it is necessary to acquire voiceprints by adopting the equipments for patrol monitoring of the electrical equipment. Typical cases are low frequency ultrasonic detection techniques applied, for example, in insulation diagnostics of high voltage equipment. Because the running state of the electrical equipment is monitored by sound, so that the non-contact and lossless measurement can be achieved, and the acoustic voiceprint detection technology is widely popularized. With several innovations of the signal transmission technology and the coming of big data era, the acoustic voiceprint monitoring technology gradually develops towards intellectualization and networking.

CN114280436A shows an F—P ultrasonic sensor array implantation device for monitoring the partial discharge of an electrical equipment, and the device is composed of an F—P ultrasonic sensor support, an F—P ultrasonic sensor array and an optical fiber connection terminal. The array can be implanted into an electrical equipment with a sleeve and a current transformer coaxial structure, ultrasonic signals generated by partial discharge of multiple parts such as a sleeve, a body, a lead and a coil of the electrical equipment may be sensitively and rapidly detected, and the detection range may cover 20 kHz~300 kHz ultrasonic frequency band. However, the technical scheme still has certain limitations, the monitored sound wave frequency band range is relatively narrow, weak acoustic signals cannot be monitored, and the intelligent standard of the voiceprint monitoring of the electrical equipment cannot be completely achieved.

A sound gathering device used in the voiceprint monitoring technology is a key component for the voiceprint monitoring, and the related art mostly focuses on the design and improvement of a mechanical structure of the sound gathering device, but the problem of large monitoring sound loss exists all the time, and the voiceprint monitoring effect of the electrical equipment is seriously affected.

SUMMARY

The present application provides a sound gathering device for voiceprint monitoring and a preparation method. In particular, a pattern array is set as a square annular shaped groove array, and the width and the depth of a corresponding groove are set to correspondingly adjust an inclination angle of a trumpet-shaped front end portion, so that the loss rate of the acquired sound wave is reduced and the reflectivity is increased.

In a first aspect, the present application provides a sound gathering device for voiceprint monitoring. The sound gathering device is a cone structure and includes a front end portion and a rear end portion. The front end portion is trumpet-shaped, an inner wall surface of the front end portion is configured to present a pattern array of microstructures, and the pattern array of microstructures is formed by laser etching.

A sound wave frequency monitored by the sound gathering device is 50 Hz~10 kHz, and a sound wave enters the sound gathering device from an entrance of the front end portion, is reflected through the pattern array of microstructures on the inner wall surface of the front end portion, and is transmitted from an exit of the rear end portion, and a sound pressure of the exit of the rear end portion is 4 times~8 times a sound pressure of the entrance of the front end portion.

In a second aspect, the present application further provides a method for preparing the sound gathering device described above, and the method includes that: a sound gathering device with a cone structure is prefabricated, where the sound gathering device includes a front end portion and a rear end portion; a path where a laser beam travels is planned based on a pattern array of an inner wall surface of the front end portion of the sound gathering device; a parameter value of a laser is set, where a parameter category of the laser includes a laser pulse width, a laser wavelength, a power range and a scan speed; a laser focusing device is built according to a laser beam focusing manner to focus a laser beam emitted by the laser; and the laser is started, and laser etching is performed on the inner wall surface of the front end portion to prepare microstructures of an inner surface of the sound gathering device.

BRIEF DESCRIPTION OF DRAWINGS

FIG. 5 is a flowchart of a method for preparing a sound gathering device according to an embodiment of the present application; and FIG. 6 is a schematic diagram of a laser focusing device for focusing a laser beam according to an embodiment of the present application.

REFERENCE LIST

Figure 1:
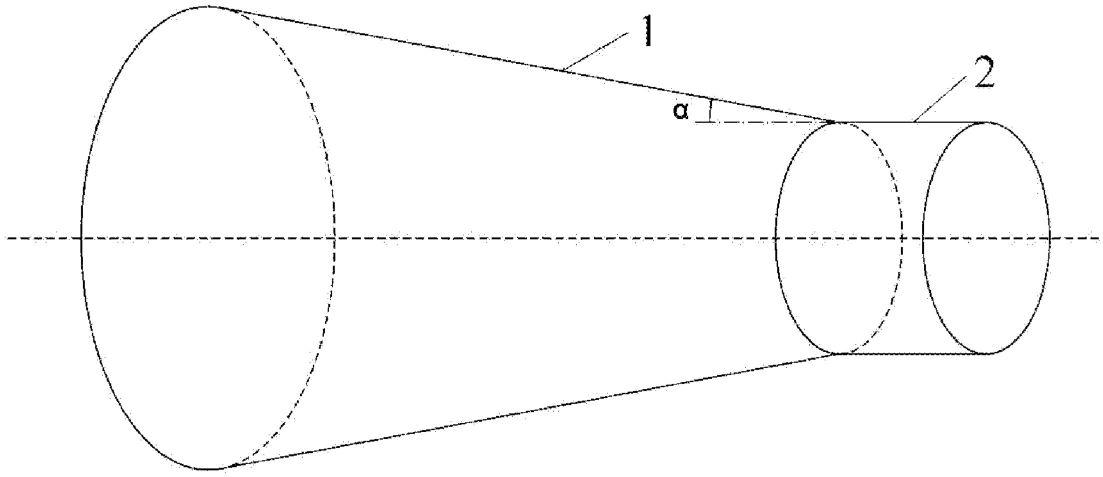
FIG. 1 is a diagram showing an overall structure of a sound gathering device for voiceprint monitoring according to an embodiment of the present application.

1 front end portion
2 rear end portion
3 microstructure
4 a square annular shaped groove
41 central groove
42 edge step
5 laser focusing device

DETAILED DESCRIPTION

The above-described technical schemes will be described below in connection with the drawings and the specific embodiments. The described embodiments are merely part of the embodiments of the present application.

The terminology used in embodiments of the present application is for the purpose of describing particular embodiments only and is not intended to limit the present application. As used in the embodiments of the present application and the appended claims, the singular forms "a", "the" and "this" are also intended to include the plural forms, unless the context indicates otherwise, "plural" generally includes at least two.

Terms such as "include", "contain" or any other variation thereof are intended to cover a non-exclusive inclusion, so that an article or device including a list of elements includes not only those elements but also other elements not expressly listed, or elements inherent to such article or device. Without more limitations, an element defined by the phrase "including an . . . " does not exclude the presence of additional same elements in the article or device including the element.

Figure 2:
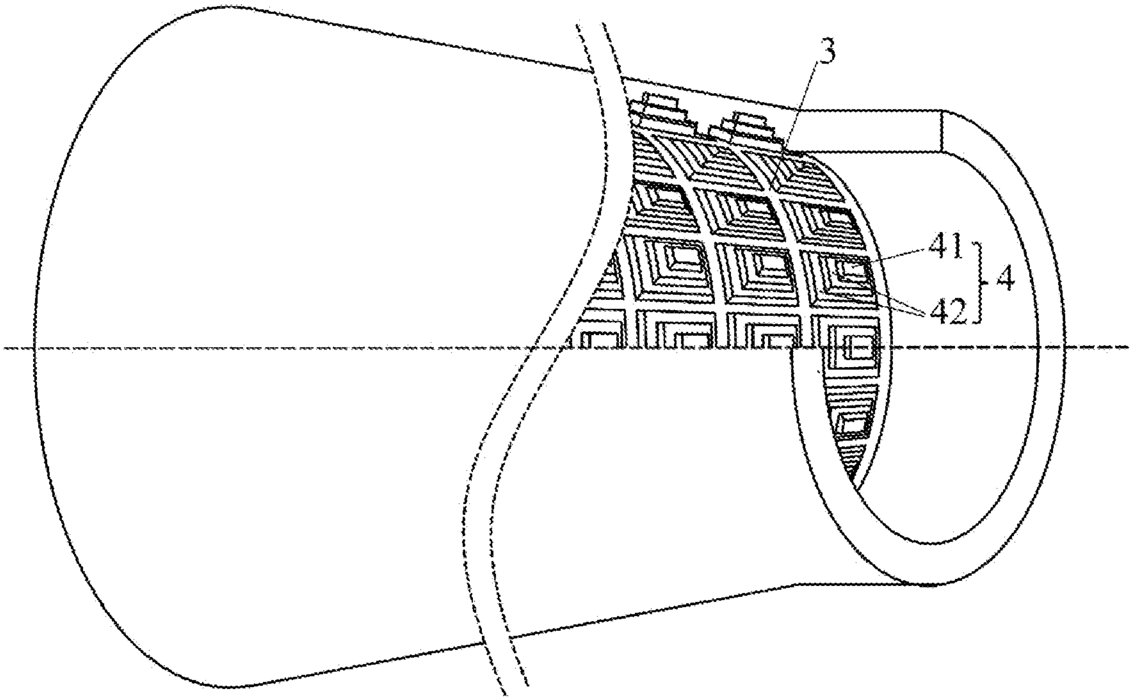
FIG. 2 is a partial cross-sectional view of a sound gathering device for voiceprint monitoring according to an embodiment of the present application.

As shown in FIG. 1 and FIG. 2, the present application provides a sound gathering device for voiceprint monitoring. The sound gathering device is a cone structure as a whole and includes a front end portion 1 and a rear end portion 2. The front end portion 1 is trumpet-shaped. An inner wall surface of the front end portion 1 is configured to present a pattern array of microstructures 3. The pattern array of microstructures 3 is formed by laser etching.

A sound wave frequency monitored by the sound gathering device is 50 Hz~10 kHz, and a sound wave enters the sound gathering device from an entrance of the front end portion 1, is reflected through the pattern array of microstructures 3 on the inner wall surface of the front end portion 1, and is transmitted from an exit of the rear end portion 2, and a sound pressure of the exit of the rear end portion 2 is 4 times~8 times a sound pressure of the entrance of the front end portion 1.

A front section of the front end portion 1 is the entrance of the sound wave, and a rear section of the front end portion 1 is the exit of the sound wave. After the sound wave is transmitted from the front end portion 1, the sound wave enters the rear end portion 2, and then enters the subsequent device for voiceprint monitoring from the rear end portion 2, thereby completing the acquisition of the weak acoustic signal of an electrical equipment.

In the related art, the sound gathering device has a relatively smooth surface, and cannot perform a directional regulation control on reflected sound waves. In the present application, the improvement of the sound gathering device is based on the idea of material surface micro-processing. The acoustic micro-structure size and morphology of an inner surface of the sound gathering device are regulated and controlled by the ultra-fast laser micro-nano processing technology. The micro-structure 3 presenting the pattern array is etched on the inner wall surface of the trumpet-shaped front end portion 1 of the sound gathering device, so that the regulation and control of the inner surface of the sound gathering device to the sound wave is increased, and meanwhile the directivity of the sound is enhanced.

In an embodiment, a material of the sound gathering device for voiceprint monitoring may be metal or plastic, and the front end portion 1 and the rear end portion 2 may be different materials, which are not limited here. A length of the front end portion 1 is set to be in a range of 5 cm to 30 cm, and a length of the rear end portion 2 is set to be in a range of 2 cm to 10 cm. The inner wall surface of the front end portion 1 is laser-etched into the pattern array of microstructures 3, and an inner wall surface of the rear end portion 2 is a relatively smooth surface, and a roughness of the inner wall surface of the rear end portion 2 is set to be 0.1 μm~1 μm.

A size of the front end portion 1 of the sound gathering device and a size of the rear end portion 2 of the sound gathering device are set, so that the sound wave is reflected on the inner wall surface of the front end portion 1 and then is specularly reflected on the relatively smooth surface of the rear end portion 2 so as to achieve the acquisition and monitoring of weak acoustic signals of the electrical equipment, thereby not only extending the path of reflection of the sound wave without increasing a number of reflections, but also reducing the loss of the weak sound wave signals in an acquisition process through the sound gathering device. Meanwhile, the inner wall surface of the trumpet-shaped structure of the front end portion 1 is subjected to the machining of the microstructure, so that the machining is more convenient and faster, and meanwhile the machining precision may be ensured.

Figure 3:
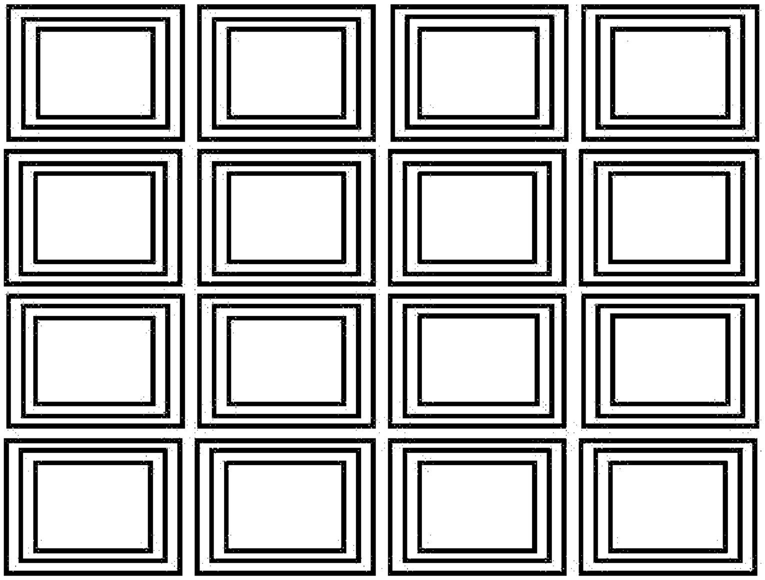
FIG. 3 is a schematic structural diagram of a square annular shaped groove array on an inner wall surface of a front end portion according to an embodiment of the present application.

In an embodiment, as shown in FIGS. 2 and 3, the pattern array of the microstructure 3 on the inner wall surface of the front end portion 1 is defined as a square annular shaped groove array, and a shape of the whole square annular shaped groove array is rectangular.

The square annular shaped groove array includes multiple square annular shaped grooves 4 arranged side by side, and the multiple square annular shaped grooves 4 have a same size.

A width range of each square annular shaped groove 4 is defined as 200 μm~400 μm, and a spacing range between two adjacent square annular shaped grooves 4 is defined as 18 μm~22 μm.

Each square annular shaped groove 4 includes a central groove 41 and at least two layers of edge steps 42, a depth of the central groove 41 is 40 μm~50 μm, the depth of the central groove 41 is a vertical depth relative to the inner wall surface of the front end portion 1, a width of each layer of edge step of the at least two layers of edge steps 42 is 20 μm~30 μm, the edge step 42 extends layer by layer from an edge line of the square annular shaped groove 4 towards a position of the central groove 41, and a layer-by-layer depth of the edge step 42 and a number of layers of the edge step 42 are not limited here. A number of layers of the edge step 42 shown in FIG. 2 is two.

A depth value of the central groove 41, a width value of the edge step 42, the number of layers of the edge step 42, and a depth value of each layer of the edge step 42 may be adaptively defined according to different monitored electrical equipments.

When the inner wall surface of the front end portion 1 is provided as the square annular shaped groove array, the reflection path of the weak sound wave in the whole sound gathering device is extended by disposing the inner wall surface at a level of depth and shallow, and the edge step 42 disposed in the square annular shaped groove 4 may also function as a transition, thereby reducing the loss of the weak sound wave in the reflection process.

Figure 4:
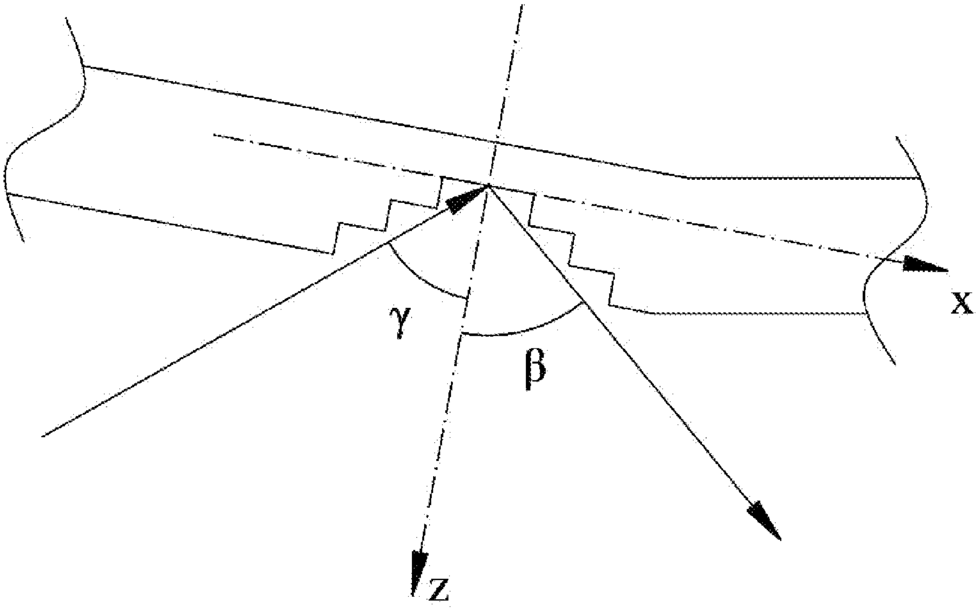
FIG. 4 is a schematic view of a reflection path of a sound wave under a square annular shaped groove array of an inner wall surface of a front end portion according to an embodiment of the present application.

As shown in FIG. 4, after a sound wave in a specific direction enters the front end portion 1 of the sound gathering device, the sound wave in the specific direction is incident on the central groove 41 of the square annular shaped groove array on the inner wall surface, and is reflected and transmitted into the rear end portion 2 so as to acquire the sound wave. The sound wave reflection path in other directions or angles are similar to those given in FIG. 4 and will not be repeated here. In an embodiment where sound wave acquisition monitoring is performed for each electrical equipment, the relationship between the inclination angle of the front end portion 1, the depth of the central groove 41 of each square annular shaped groove of the square annular shaped groove array, the width of the edge step 42, and the monitored sound wave parameters is taken into account for sound waves transmitted in multiple directions.

Based on the width of each square annular shaped groove 4, the depth of the central groove 41 and the width of the edge step 42, and the inclination angle of the front end portion 1 is correspondingly set so as to increase the phase of the weak sound wave reflected by the square annular shaped groove 4, and thus increase the reflectivity of the acquired sound wave.

A relationship among the inclination angle of the front end portion 1, the depth of the central groove 41 of each square annular shaped groove 4 of the square annular shaped groove array, the width of the edge step 42, and the monitored sound wave parameter is as follows:

$$\Delta(\varphi-\varphi)=\frac{2\pi}{\lambda}\left(\sqrt{[(1-2d)\cdot\cos\alpha]^2+[(H+h)\cdot\sin\alpha)]^2}-\sqrt{[(1-2d)\cdot\cos\alpha]^2+(H\cdot\sin\alpha)^2}\right)$$

Where φ is a change phase of the sound wave reflected by the multiple square annular shaped grooves 4, ϕ is an additional phase of the sound wave incident on a surface of the square annular shaped groove, Δ(φ-ϕ) is a phase difference compared to a smooth inner wall surface, λ is a wavelength of the sound wave, l is the width of the each square annular shaped groove 4, d is a total width of a single edge step of the each square annular shaped groove 4, H is an absolute value of a difference between a reflection height of the sound wave and an incident height of the sound wave, h is the depth of the central groove 41, and α is the inclination angle of the front end portion 1.

It is also necessary to consider the problem of loss of the weak sound wave in increasing the reflectivity of the weak acoustic waves using the square annular shaped groove array.

In order to reduce the loss when the weak sound wave is reflected inside the sound gathering device, it is necessary to minimize a number of times for reflection of the weak sound wave. Therefore, it is necessary to ensure that the sound waves entering the front end portion 1 of the sound gathering device from multiple directions are transmitted to the rear end portion 2 after the square annular shaped groove 4 has been reflected a small number of times, and then enter the sound wave monitoring and processing device of the rear section.

Based on the width of the square annular shaped groove, the depth of the central groove, and the width of the edge step, an inclination angle of the trumpet at the front end are correspondingly set, so that the phase of the sound wave reflected by the square annular shaped groove is increased, and further the reflectivity of the sound wave is increased. On the basis of increasing the reflectivity of the sound wave. For the purpose of reducing the loss of the sound wave, it is necessary to consider that the reflection angle of the sound wave passing through the surface of the square annular shaped groove is increased based on the values of the width of the square annular shaped groove 4, the depth of the central groove 41, and the width of the edge step 42 and in combination with the trumpet-shaped inclination angle of the front end portion 1, so that a number of times for reflection are reduced, and thus the loss of the weak sound wave in the acquisition and propagation of the sound gathering device is reduced.

The relationship among the inclination angle of the front end portion 1, the depth of the central groove 41 of each square annular shaped groove 4 of the square annular shaped groove array, the width of the edge step 42, and the monitored sound wave parameter also needs to satisfy the following conditions:

$$\sin\beta-\sin\gamma=\frac{\lambda}{2\pi}\frac{d\varphi(x)}{dx}\tan\alpha\cdot\frac{l-2d}{h}$$

Where β is a reflection angle of the sound wave passing through a surface of the square annular shaped groove, γ is an incidence angle of the sound wave incident on a surface of the square annular shaped groove, x is a lateral coordinate value of the sound wave incident on a point in a surface of the square annular shaped groove, $$\frac{d\varphi(x)}{dx}$$

is a derivative value of a change phase of the sound wave at a point where the lateral coordinate value is x and x, λ is a wavelength of the sound wave, l is the width of the square annular shaped groove 4, d is a total width of a single edge step of the square annular shaped groove 4, h is the depth of the central groove 41, and α is the inclination angle of the front end portion 1.

A relationship among the depth of the central groove 41, the width of each square annular shaped grooves 4, and the total width of the single edge step of each square annular shaped groove 4 is as follows:

$$h=\frac{R(1-2d)}{\tan\alpha}$$

In the formula, l is the width of each square annular shaped groove 4, d is a total width of a single edge step of the each square annular shaped groove 4, h is the depth of the central groove 41, and α is the inclination angle of the front end portion 1. In an embodiment, a value of the inclination angle of the front end portion 1 is 15°~60°, and a value range of R is 0.1~0.65.

In a case where the value range of the inclination angle of the front end portion 1 is set to comply with the relationship among the inclination angle of the front end portion 1, the depth of the central groove 41 of each square annular shaped groove 4 of the square annular shaped groove array, the width of the edge step 42 and the monitored sound wave parameter, the weak sound wave acquired by the sound gathering device is increased by about 15%~25% in terms of reflectance and is decreased by about 15%~25% in terms of the loss rate compared with the weak sound wave acquired by the smooth inner wall surface, in particular, the sound wave for a specific frequency range.

Meanwhile, as shown in FIG. 5, the present application further provides a method for preparing the sound gathering device described above, the method includes that: a sound gathering device with a cone structure is prefabricated, where the sound gathering device includes a front end portion 1 and a rear end portion 2; a path where a laser beam travels is planned based on a pattern array of an inner wall surface of the front end portion 1 of the sound gathering device; a parameter value of a laser is set, where a parameter category of the laser includes a laser pulse width, a laser wavelength, a power range and a scan speed; a laser focusing device 5 is built according to a laser beam focusing manner to focus a laser beam emitted by the laser; and the laser is started, and laser etching is performed on the inner wall surface of the front end portion 1 to prepare microstructures 3 of an inner surface of the sound gathering device The front end portion 1 of the sound gathering device has a trumpet-shaped structure, the conventional processing method cannot be deeply processed, and the customization degree is relatively low. According to the present application, an ultra-fast laser processing method is used for the inner wall surface of the front end portion 1 of the sound gathering device, so that a pattern array of microstructures 3 is formed, the laser processing accuracy is high, and moreover, the customized processing of the complex pattern on the inner wall surface of the front end portion 1 of the sound gathering device can be achieved, and it is suitable for the weak sound wave monitoring and diagnosis of the electrical equipment in different scenes.

In an embodiment, that the path that the laser beam travels is planned includes that: a scan manner is set to be in a grid shape in the laser, and path node information that the beam travels in a scan processing process is input. A position for selecting the path node information is not limited, and may be set according to shapes of different pattern array, and moreover, a number of times that the laser beam travels is not limited, whereby it is ensured that a complete customized pattern array with high precision may be obtained.

A gap between parallel lines is set to be 18 μm~22 μm in a laser scan, and a laser spot diameter is set to be in a range of 13 μm to 17 μm. A value of the gap between parallel lines and a value of the laser spot diameter selected here are mainly determined based on the overall shape of the pattern array of microstructures 3 and the numerical range of the depth and width. The numerical value is also not limited, and the value of the gap between the parallel lines in a particular laser scan and the laser spot diameter may be defined according to the weak sound wave characteristics of the monitored electrical equipment.

In an embodiment, that the parameter value of the laser is set includes that: the laser pulse width is set to be 0.001 fs~1 fs, the laser wavelength is set to be 355 nm~1064 nm, the power range is set to be 50 mW~15 W, and the scan speed is set to be 200 mm/s~800 mm/s.

Parameters of the laser power of the laser are defined and the pattern array of microstructures 3 on the inner wall surface of the front end portion 1 of the sound gathering device is adapted, so that the processing depth and width of the material of the inner wall surface may be adjusted and controlled, and further the pattern array of microstructures in a corresponding scene may be prepared.

In an embodiment, as shown in FIG. 6, the laser focusing device 5 focuses the laser light emitted from the laser. The laser focusing device 5 includes a reflector mirror group, a beam expansion mirror, a scan galvanometer and an F-Theta lens. The reflector mirror group is configured to adjust a scan movement of the laser beam, the etching on the inner wall surface of the front end portion 1 is achieved by the scan movement of the laser beam so as to prepare a pattern array of microstructures 3 A beam expansion multiple of the beam expansion mirror is 2 times~4 times, a range of the scan galvanometer is greater than or equal to (100×100) mm, and a focus range of the F-Theta lens greater than or equal to (−30~30) mm.

A range of the scan galvanometer is defined as the transverse direction (X-axis direction) and the longitudinal direction (Y-axis direction) of the whole laser focusing plane, that is, the range of the scan galvanometer is not less than 100×100 mm. In general, the transverse and longitudinal sizes of the scan galvanometer are the same. The focus range of the F-Theta lens defines the vertical direction (Z-axis direction) of the whole laser focusing plane, that is, a numerical value of a focal point of the F-Theta lens in a vertical direction of the F-Theta lens is not less than 30 mm.

A numerical value of the beam expansion multiple of the beam expansion mirror for focusing of laser-emitted beam, a numerical value of the range of the scan galvanometer and a numerical value of the focus range of the F-Theta lens are all related to a process of processing the pattern array on the inner wall surface of the front end portion 1 of the sound gathering device. Within the numerical range, the precision and the efficiency of processing the pattern array of microstructures on the inner wall surface can be ensured. The numerical value is not particularly limited, and may be adjusted according to a value of the size of the pattern array to be applied. The scan galvanometer and the F-Theta lens are combined to achieve the scan processing of a high-freedom three-dimensional space, and the processing method is suitable for processing the pattern array of microstructures 3 on the inner wall surface of the trumpet-shaped sound gathering device.

In an embodiment, the laser beam is focused in a positive defocus, and a defocus amount is 1 μm~5 μm.

The defocus amount is the spacing between the laser beam and the inner wall surface of the front end portion 1 of the sound focusing device, and an appropriate defocusing amount is provided, so that the accuracy of the laser processing can be ensured. If the defocusing amount is too small, the laser may cause serious damage to the inner wall surface, so that the surface is rough, the machining precision of the pattern array cannot be ensured, and the square annular shaped groove 4 may be tapered. Since the defocusing amount is too large, the energy of the laser cannot be sufficiently transmitted to the inner wall surface and cannot be processed to form the microstructure 3 in accordance with the expected pattern array.

The present application provides a sound gathering device for voiceprint monitoring and a preparation method, and they includes the following effects.

a. The inner wall surface of the front end portion is provided with the pattern array of microstructures, so that the frequency range of the sound wave monitoring may be expanded, the reflectivity of the sound wave may be improved, and the loss of the sound wave may be reduced.

b. The pattern array is designed as the square annular shaped groove array structure to prolong the transmission path of the sound wave in the space of the sound gathering device, reduce the number of times for reflection of the sound wave, improve the reflectivity of the sound wave, and reduce the loss of the sound wave. In a case where the depth of the central groove of the square annular shaped groove, the width of the groove, the width of the edge step, and the inclination angle of the trumpet-shaped front end portion are set, the reflectivity of the sound wave is increased by 15%~25% compared with the smooth inner wall surface, and the loss rate of the sound wave is decreased by 15%~25% compared with the smooth inner wall surface.

c. By means of laser scanning processing, the laser beam may be applied to the pattern array of microstructures, so that the processing speed of the pattern array of microstructures on the inner wall surface of the front end portion is ensured, and thus the processing accuracy of the microstructure is improved. By means of the sound wave acquired by the pattern array of microstructures formed by laser scan etching, the reflectivity is improved, and meanwhile the loss in the sound wave transmission process is reduced.

d. The parameters of the laser power of the laser are defined to adapt to the pattern array of microstructures on the inner wall surface of the front end portion of the sound gathering device, so that the processing depth and width of the material of the inner wall surface may be regulated and controlled, and further the pattern array of microstructures of the corresponding scene may be prepared. The machining precision and efficiency of the pattern array of microstructures on the inner wall surface can be ensured by the numerical value of the beam expansion multiple of the beam expansion mirror for focusing of laser-emitted beam, the numerical value of the range of the scan galvanometer and the numerical value of the focus range of the F-Theta lens. The combination of the scan galvanometer and the F-Theta lens enables the scan processing of a high-freedom three-dimensional space, and the processing method is suitable for processing the pattern array of microstructures on the inner wall surface of the trumpet-shaped sound gathering device. The processing precision of the laser can be ensured by setting the proper defocusing amount.

What is claimed is:

1. A sound gathering device for voiceprint monitoring, wherein the sound gathering device is a cone structure and comprises a front end portion and a rear end portion, the front end portion is trumpet-shaped, an inner wall surface of the front end portion is configured to present a pattern array of microstructures, and the pattern array of microstructures is formed by laser etching;

a sound wave frequency monitored by the sound gathering device is 50 Hz~10 kHz, and a sound wave enters the sound gathering device from an entrance of the front end portion, is reflected through the pattern array of microstructures on the inner wall surface of the front end portion, and is transmitted from an exit of the rear end portion, and a sound pressure of the exit of the rear end portion is 4 times~8 times a sound pressure of the entrance of the front end portion.

2. The sound gathering device of claim 1, wherein the sound gathering device is made of metal or plastic, a length of the front end portion is in a range of 5 cm to 30 cm, a length of the rear end portion is in a range of 2 cm to 10 cm, and a roughness of an inner wall surface of the rear end portion is 0.1 μm~1 μm.

3. The sound gathering device of claim 1, wherein the pattern array of microstructures is a structure of a square annular shaped groove array, and the square annular shaped groove array is rectangular;

the square annular shaped groove array comprises a plurality of square annular shaped grooves arranged side by side, the plurality of square annular shaped grooves have a same size, a width of each square annular shaped groove of the plurality of square annular shaped grooves is 200 μm~400 μm, and a spacing between two adjacent square annular shaped grooves among the plurality of square annular shaped grooves is 18 μm~22 μm; and each square annular shaped groove comprises a central groove and at least two layers of edge steps, a depth of the central groove is 40 μm~50 μm, and a width of each layer of edge step of the at least two layers of edge steps is 20 μm~30 μm.

4. The sound gathering device of claim 3, wherein a relationship among an inclination angle of the front end portion, the depth of the central groove of the square annular shaped groove, the width of each layer of edge step of the at least two layers of edge steps, and a monitored sound wave parameter is as follows:

$$\begin{cases} \Delta(\varphi-\phi)=\frac{2\pi}{\lambda}\left(\sqrt{[(1-2d)\cdot\cos\alpha]^2+[(H+h)\cdot\sin\alpha]^2}-\right.\\ \left.\sqrt{[(1-2d)\cdot\cos\alpha]^2+(H\cdot\sin\alpha)^2}\right)\\ \sin\beta-\sin\gamma=\frac{\lambda}{2\pi}\frac{d\varphi(x)}{dx}\tan\alpha\cdot\frac{l-2d}{h} \end{cases}$$

wherein φ is a change phase of the sound wave reflected by the plurality of square annular shaped grooves (4), ϕ is an additional phase of the sound wave incident on a surface of the square annular shaped groove, Δ(φ-ϕ) is a phase difference compared to a smooth inner wall surface, λ is a wavelength of the sound wave, l is the width of the each square annular shaped groove, d is a total width of a single edge step of the each square annular shaped groove, H is an absolute value of a difference between a reflection height of the sound wave and an incident height of the sound wave, h is the depth of the central groove, α is the inclination angle of the front end portion; β is a reflection angle of the sound wave passing through a surface of the square annular shaped groove, γ is an incidence angle of the sound wave incident on the surface of the square annular shaped groove, x is a lateral coordinate value of the sound wave incident on a point of a surface of a square annular shaped groove, and $$\frac{d\varphi(x)}{dx}$$

is a derivative value of a change phase of the sound wave at a point where the lateral coordinate value is x and x.

5. The sound gathering device of claim 4, wherein a relationship among the depth of the central groove, the width of the each square annular shaped groove, and the total width of the single edge step of the each square annular shaped groove is as follows:

$$h = \frac{R(l-2d)}{\tan\alpha}$$

wherein a value range of α is 15°~60°, and a value range of R is 0.1~0.65.

6. A preparation method for preparing a sound gathering device, wherein the sound gathering device is a cone structure and comprises a front end portion, and a rear end portion, the front end portion is trumpet-shaped, an inner wall surface of the front end portion is configured to present a pattern array of microstructures, and the pattern array of microstructures is formed by laser etching;

a sound wave frequency monitored by the sound gathering device is 50 Hz~10 kHz, and a sound wave enters the sound gathering device from an entrance of the front end portion, is reflected through the pattern array of microstructures on the inner wall surface of the front end portion, and is transmitted from an exit of the rear end portion, and a sound pressure of the exit of the rear end portion is 4 times~8 times a sound pressure of the entrance of the front end portion;

where the method comprising:

prefabricating a sound gathering device with a cone structure, wherein the sound gathering device comprises a front end portion and a rear end portion;

planning a path where a laser beam travels based on a pattern array of an inner wall surface of the front end portion of the sound gathering device;

setting a parameter value of a laser, wherein a parameter category of the laser comprises a laser pulse width, a laser wavelength, a power range and a scan speed;

building a laser focusing device according to a laser beam focusing manner to focus a laser beam emitted by the laser; and starting the laser, and performing laser etching on the inner wall surface of the front end portion to prepare a microstructure of an inner surface of the sound gathering device.

7. The method of claim 6, wherein the planning the path where the laser beam travels comprises:

setting, in the laser, a scan manner to be in a grid shape, and inputting path node information indicating travels of the laser beam in a scan processing process;

setting, in a laser scan, a gap between parallel lines to be 18 μm~22 μm, and setting a laser spot diameter to be in a range of 13 μm to 17 μm.

8. The method of claim 6, wherein the setting the parameter value of the laser comprises:

setting the laser pulse width to be 0.001 fs~1 fs, setting the laser wavelength to be 355 nm~1064 nm, setting the power range to be 50 mW~15 W, and setting the scan speed to be 200 mm/s~800 mm/s.

9. The method of claim 6, wherein the laser focusing device comprises a reflector mirror group, a beam expansion mirror, a scan galvanometer and an F-Theta lens, wherein the reflector mirror group is configured to adjust a scan movement of the laser beam;

a beam expansion multiple of the beam expansion mirror is in a range of 2 times to 4 times, a range of the scan galvanometer is greater than or equal to (100×100) mm, and a numerical value of a focal point of the F-Theta lens in a vertical direction of the F-Theta lens is not less than 30 mm.

10. The method of claim 9, wherein the laser beam is focused in a positive defocus, and a defocus amount is in a range of 1 μm to 5 μm.

11. The method of claim 6, wherein the sound gathering device is made of metal or plastic, a length of the front end portion is in a range of 5 cm to 30 cm, a length of the rear end portion is in a range of 2 cm to 10 cm, and a roughness of an inner wall surface of the rear end portion is 0.1 μm~1 μm.

12. The method of claim 6, wherein the pattern array of microstructures is a structure of a square annular shaped groove array, and the square annular shaped groove array is rectangular;

the square annular shaped groove array comprises a plurality of square annular shaped grooves arranged side by side, the plurality of square annular shaped grooves have a same size, a width of each square annular shaped groove of the plurality of square annular shaped grooves is 200 μm~400 μm, and a spacing between two adjacent square annular shaped grooves among the plurality of square annular shaped grooves is 18 μm~22 μm; and each square annular shaped groove comprises a central groove and at least two layers of edge steps, a depth of the central groove is 40 μm~50 μm, and a width of each layer of edge step of the at least two layers of edge steps is 20 μm~30 μm.

13. The method of claim 12, wherein a relationship among an inclination angle of the front end portion, the depth of the central groove of the square annular shaped groove, the width of each layer of edge step of the at least two layers of edge steps, and a monitored sound wave parameter is as follows:

$$\begin{cases} \Delta(\varphi-\phi) = \frac{2\pi}{\lambda}\Big(\sqrt{[(1-2d)\cdot\cos\alpha]^2 + [(H+h)\cdot\sin\alpha]^2} - \\ \sqrt{[(1-2d)\cdot\cos\alpha]^2 + (H\cdot\sin\alpha)^2}\Big) \\ \sin\beta - \sin\gamma = \frac{\lambda}{2\pi}\frac{d\varphi(x)}{dx}\tan\alpha\cdot\frac{l-2d}{h} \end{cases}$$

wherein φ is a change phase of the sound wave reflected by the plurality of square annular shaped grooves (4), ϕ is an additional phase of the sound wave incident on a surface of the square annular shaped groove, Δ(φ-ϕ) is a phase difference compared to a smooth inner wall surface, λ is a wavelength of the sound wave, l is the width of the each square annular shaped groove, d is a total width of a single edge step of the each square annular shaped groove, H is an absolute value of a difference between a reflection height of the sound wave and an incident height of the sound wave, h is the depth of the central groove, α is the inclination angle of the front end portion; β is a reflection angle of the sound wave passing through a surface of the square annular shaped groove, γ is an incidence angle of the sound wave incident on the surface of the square annular shaped groove, x is a lateral coordinate value of the sound wave incident on a point of a surface of a square annular shaped groove, and $$\frac{d\varphi(x)}{dx}$$

is a derivative value of a change phase of the sound wave at a point where the lateral coordinate value is x and x.

14. The method of claim 13, wherein a relationship among the depth of the central groove, the width of the each square annular shaped groove, and the total width of the single edge step of the each square annular shaped groove is as follows:

$$h = \frac{R(l - 2d)}{\tan\alpha}$$

wherein a value range of α is 15°~60°, and a value range of R is 0.1~0.65.

* * * * *